United States Patent [19]

Muraji

[11] Patent Number: 5,317,674
[45] Date of Patent: May 31, 1994

[54] CENTER-OF-GRAVITY DETERMINING CIRCUIT FOR PULSE GENERATION

[75] Inventor: Tetsuo Muraji, Odawara, Japan

[73] Assignee: Mikuni Corporation, Tokyo, Japan

[21] Appl. No.: 844,309

[22] Filed: Mar. 2, 1992

[30] Foreign Application Priority Data

Mar. 4, 1991 [JP] Japan .................................. 3-062637

[51] Int. Cl.$^5$ ............................................. G06F 9/44
[52] U.S. Cl. ...................................... 395/3; 395/900; 364/807
[58] Field of Search ............... 307/358, 357, 355, 353, 307/360, 265; 328/151, 128, 146, 147, 149; 395/3, 900; 364/807

[56] References Cited

U.S. PATENT DOCUMENTS

| | | | |
|---|---|---|---|
| 3,372,234 | 3/1968 | Bowsher et al. | 307/358 |
| 4,453,093 | 6/1984 | Bondreau | 307/355 |
| 4,464,661 | 8/1984 | Redmond | 307/355 |
| 4,523,108 | 6/1985 | Niiho et al. | 307/358 |
| 4,590,391 | 5/1986 | Valley | 307/357 |

FOREIGN PATENT DOCUMENTS 1-224802  9/1989  Japan .
2-054301  2/1990  Japan .
2-054302  2/1990  Japan .

*Primary Examiner*—William L. Sikes
*Assistant Examiner*—My-Trang Ton
*Attorney, Agent, or Firm*—Varndell Legal Group

[57] ABSTRACT

A center-of-gravity determining circuit for pulse generation which is used to obtain a manipulated variable for, for example, a fuel injection device, by using the result of fuzzy reasoning. The result of fuzzy reasoning is obtained in the form of a pulse width as a determined value.

6 Claims, 4 Drawing Sheets

CENTER-OF-GRAVITY DETERMINING CIRCUIT FOR PULSE GENERATION

BACKGROUND OF THE INVENTION

1. Field of the Invention

The present invention relates to a center-of-gravity determining circuit for pulse generation which obtains a manipulated variable required to control an actuator or the like by using results of fuzzy reasoning.

2. Description of the Prior Art

Fuzzy information obtained as a result of fuzzy reasoning appears in the form of electric signals distributed over a plurality of lines. Accordingly, it is necessary in order to control an actuator or the like by using these signals to convert them into a manipulated variable. A converting mechanism designed for this purpose is called defuzzifier. In general, the conversion is performed by arithmetically determining the center of gravity of fuzzy quantities (JP Appln No. 63-206007, 1988).

The prior art will be explained below on the basis of the contents of the above-mentioned publication.

One example of fuzzy information will be explained with reference to FIG. 6. Elements of fuzzy information are denoted by x, and it is assumed that there are discrete values $x_1, x_2, \ldots x_{n-1}, x_n$. These elements are output onto a plurality of signal lines $l_1, l_2, \ldots l_n$, respectively, and grades (functional values corresponding to variables) $\mu_1, \mu_2, \ldots \mu_n$ corresponding to these elements are represented by analog voltages or current signals appearing on the respective signal lines.

In this case, the grades $\mu_1, \mu_2, \ldots \mu_n$ are assumed to be represented by voltages. In FIG. 6, the center of gravity (position on the X axis) of fuzzy information is given by $$\text{Center of gravity} = \sum_{i=1}^{n} \mu_i x_i / \sum_{i=1}^{n} \mu_i \quad (1)$$

Accordingly, multiplication, addition and division are needed to obtain the center of gravity.

Therefore, in order to obtain the center of gravity only by addition, Equation (1) is transformed into Equation (2), and the latter is adjusted so that the denominator in Equation (2) is 1:

$$\begin{aligned}\text{Center of gravity} &= \sum_{i=1}^{n} \mu_i x_i / \sum_{i=1}^{n} \mu_i = K \sum_{i=1}^{n} \mu_i x_i / K \sum_{i=1}^{n} \mu_i \\ &= \sum_{i=1}^{n} (K\mu_i) x_i / \sum_{i=1}^{n} (K\mu_i)\end{aligned} \quad (2)$$

That is, if K is adjusted so that the denominator is 1, the center of gravity can be obtained from Equation (3):

$$\text{Center of gravity} = \sum_{i=1}^{n} (K\mu_i) x_i \quad (3)$$

Referring to FIG. 7 which is a specific circuit diagram, voltages $\mu_1, \mu_2, \ldots \mu_n$ representative of elements of fuzzy information are led out onto n signal lines $l_1, l_2, \ldots l_n$ and then multiplied by the coefficient K in a variable-grade reasoning engine 1. Fuzzy quantities $K\mu_1, K\mu_2, \ldots K\mu_n$ output from the reasoning engine 1 are input to both a weighted summing circuit 2 and a simple summing circuit 3. In the weighted summing circuit 2, calculation of the right-hand side of Equation (3) is executed to output a voltage signal representative of the center of gravity.

In the meantime, the simple summing circuit 3 executes calculation of the denominator of Equation (2) and inputs the result of the calculation to a voltage adjusting circuit 4. The other input terminal of the voltage adjusting circuit 4 is supplied with a voltage corresponding to the grade 1. Accordingly, in response to the output signal from the voltage adjusting circuit 4, the coefficient K in the variable-grade reasoning engine 1 is adjusted so that the output from the simple summing circuit 3 is 1 at all times.

According to the above-described prior art, the output signal from the simple summing circuit 3 for electric signals distributed over a plurality of lines is controlled so as to be equivalent to 1. In general, this type of control is executed by using a membership function circuit that is provided with a grade control means. In this case, no dividing circuit is needed, and the circuit configuration is simplified correspondingly, resulting in an increase in the operating speed, but on the other hand, the membership function circuit becomes complicated, and a control mechanism must be added.

In a case where the manipulated variable is the width of a pulse (e.g., an injector drive control signal of a fuel injector device or an ignition timing pulse), the determined value is output in the form of a voltage, and it is therefore necessary to provide an interface for converting the output voltage into a pulse width.

SUMMARY OF THE INVENTION

In view of the above-described circumstances, it is an object of the present invention to provide a center-of-gravity determining circuit for pulse generation which is capable of outputting a pulse width as a determined value with a simple circuit configuration.

DETAILED DESCRIPTION OF THE EMBODIMENTS

Embodiments of the present invention will be described below with reference to the accompanying drawings.

Figure 1:
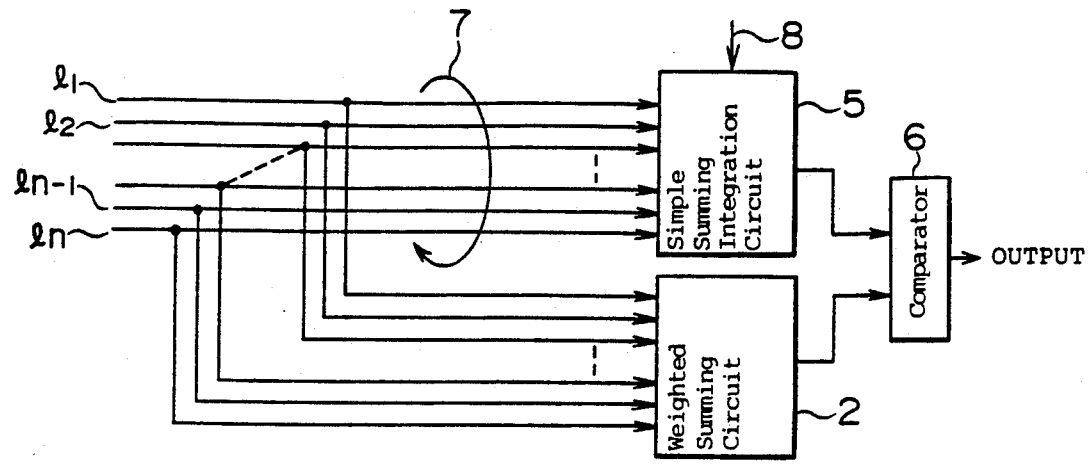
FIG. 1 is a block diagram of one embodiment of the center-of-gravity determining circuit for pulse generation according to the present invention.

FIG. 1 is a block diagram of one embodiment of the center-of-gravity determining circuit for pulse generation according to the present invention. Referring to FIG. 1, fuzzy buses 7 are connected to a simple summing integration circuit 5, and branch lines from the fuzzy buses 7 are similarly connected to a weighted summing circuit 2. A comparator 6 is supplied with outputs from the simple summing integration circuit 5 and the weighted summing circuit 2. Reference numeral 8 denotes a trigger means (not shown) for resetting the integration circuit 5.

Figure 2:
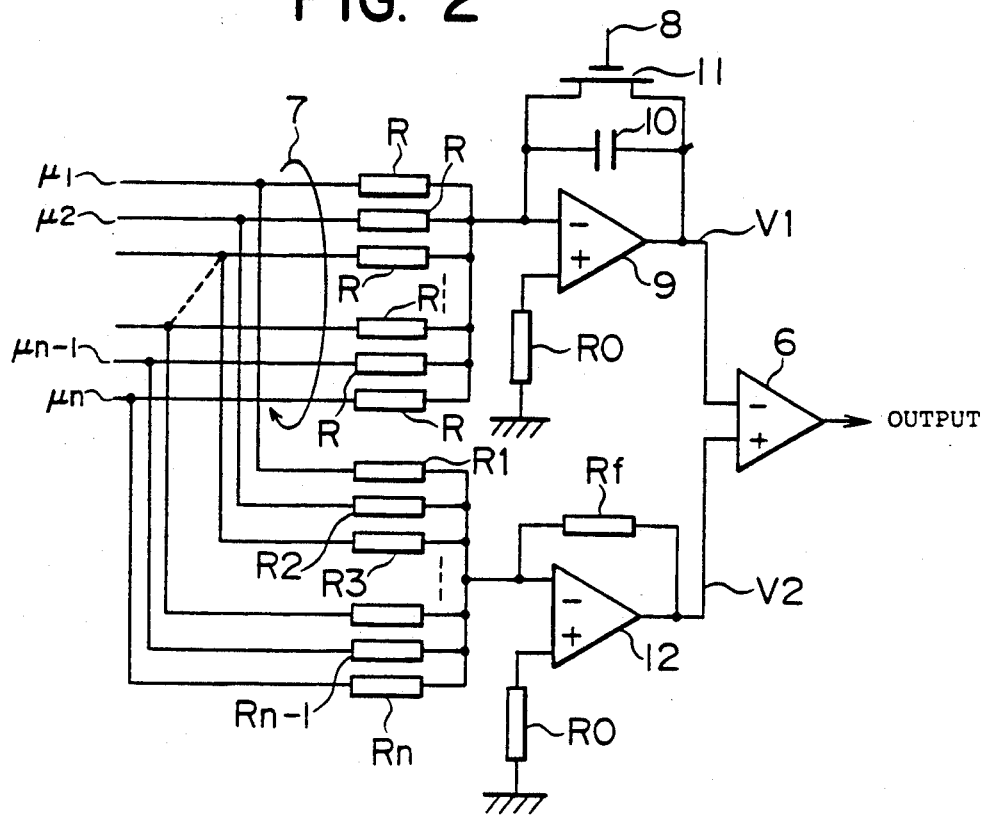
FIG. 2 illustrates in detail the arrangement shown in FIG. 1.

The arrangement of the embodiment will be further explained with reference to the detail view of FIG. 2. The simple summing integration circuit 5 is connected to the fuzzy buses 7 through respective resistances R, and a capacitor 10 and a transistor 11 are connected in parallel between a minus terminal and output terminal of an operational amplifier 9 inside the simple summing integration circuit 5. The output terminal is connected to a minus terminal of the comparator 6.

In the meantime, the weighted summing circuit 2 is connected to the fuzzy buses 7 through respective weighting resistances $R_1 \ldots R_N$, and a resistance $R_f$ is connected between a minus terminal and output terminal of an operational amplifier 12 inside the weighted summing circuit 2. The output terminal is connected to a plus terminal of the comparator 6. In addition, the plus terminal of each of the operational amplifiers 9 and 12 is grounded through a resistance $R_0$.

Figure 3:
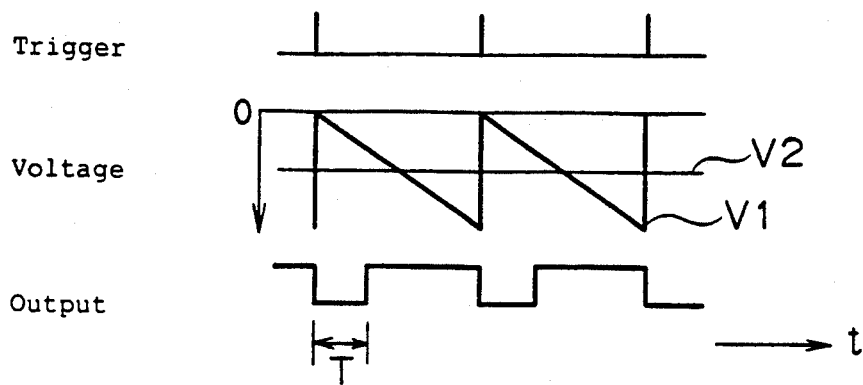
FIG. 3 is a time chart showing the operation of the arrangement shown in FIG. 2.

The operation will next be explained by using the time chart of FIG. 3.

First, in the simple summing integration circuit 5 the capacitor 10 is opened by the trigger means 8 to reset the circuit 5. As a result, the output of the comparator 6 shifts to L level. Since the transistor 11 turns off instantaneously, the simple summing integration circuit 5 executes simple summation of the voltages on the fuzzy buses 7 and delivers an inverted integration output $V_1$ which is proportional to the time constant determined by the resistance R and the capacitance C of the capacitor 10:

$$V_1 = -\frac{1}{CR} \sum_{i=1}^{n} \mu_i t \quad (4)$$

The weighted summing circuit 2 sums the voltages $\mu_i \ldots \mu_n$ on the fuzzy buses 7 in accordance with the weighting resistances $R_1 \ldots R_n$ and delivers an inverted output $V_2$ in a predetermined ratio determined by the resistance $R_f$:

$$V_2 = -R_f \sum_{i=1}^{n} \frac{1}{R_i} \mu_i \quad (5)$$

In this case, when the output $V_1$ of the simple summing integration circuit 5 becomes not higher than the output $V_2$ of the weighted summing circuit 2, the output of the comparator 6 shifts to H level. Therefore, the time T during which the comparator 6 is outputting the L-level signal is converted into a pulse width as a determined value. The time T at which $V_1 = V_2$ is reached is expressed by Equation (6), and it corresponds to the center of gravity of the fuzzy quantities on the fuzzy buses 7:

$$T = \frac{CRR_f \sum \frac{1}{R_i} \mu_i}{\Sigma \mu_i} \quad (6)$$

It should be noted that the gradient of the waveform $V_1$ can be changed as desired by weighting.

Figure 4:
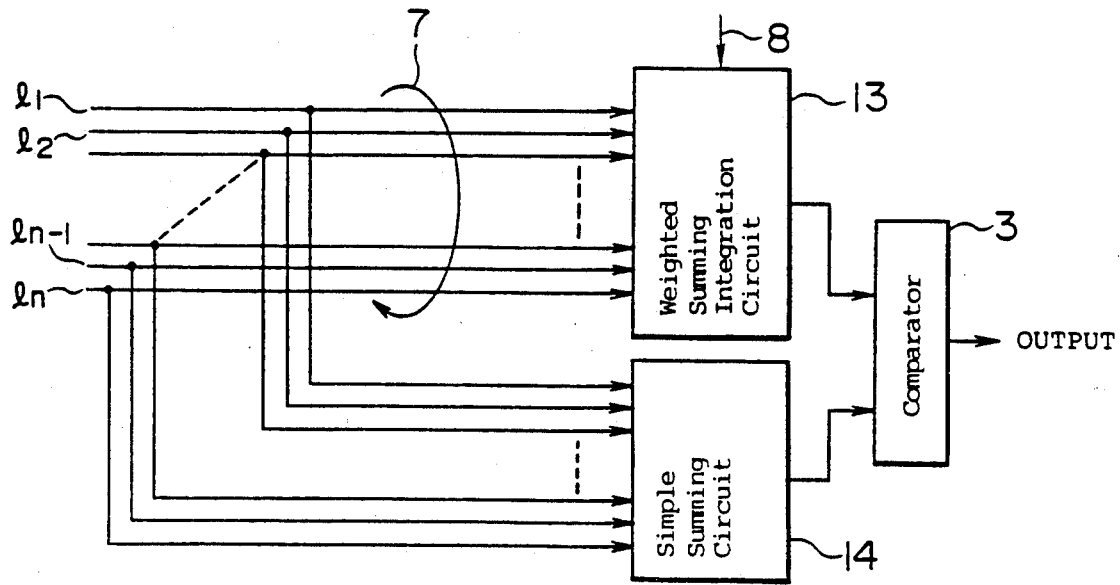
FIG. 4 is a block diagram of another embodiment of the present invention.
Figure 5:
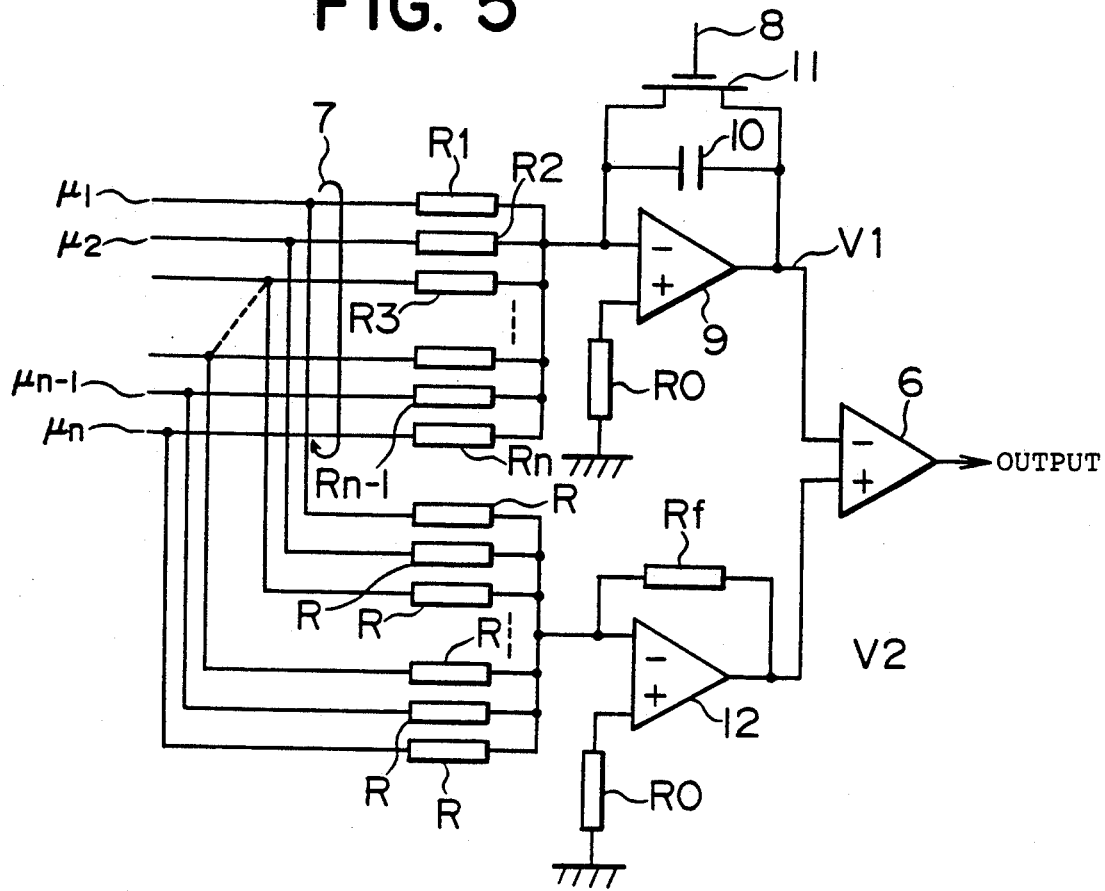
FIG. 5 illustrates in detail the arrangement shown in FIG. 4.
Figure 6:
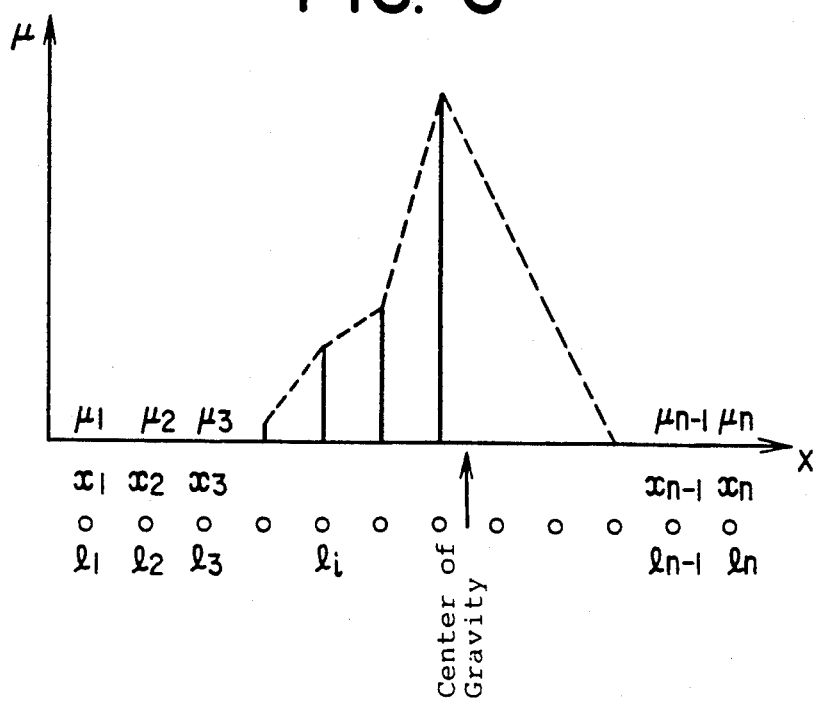
FIG. 6 shows one example of fuzzy information.
Figure 7:
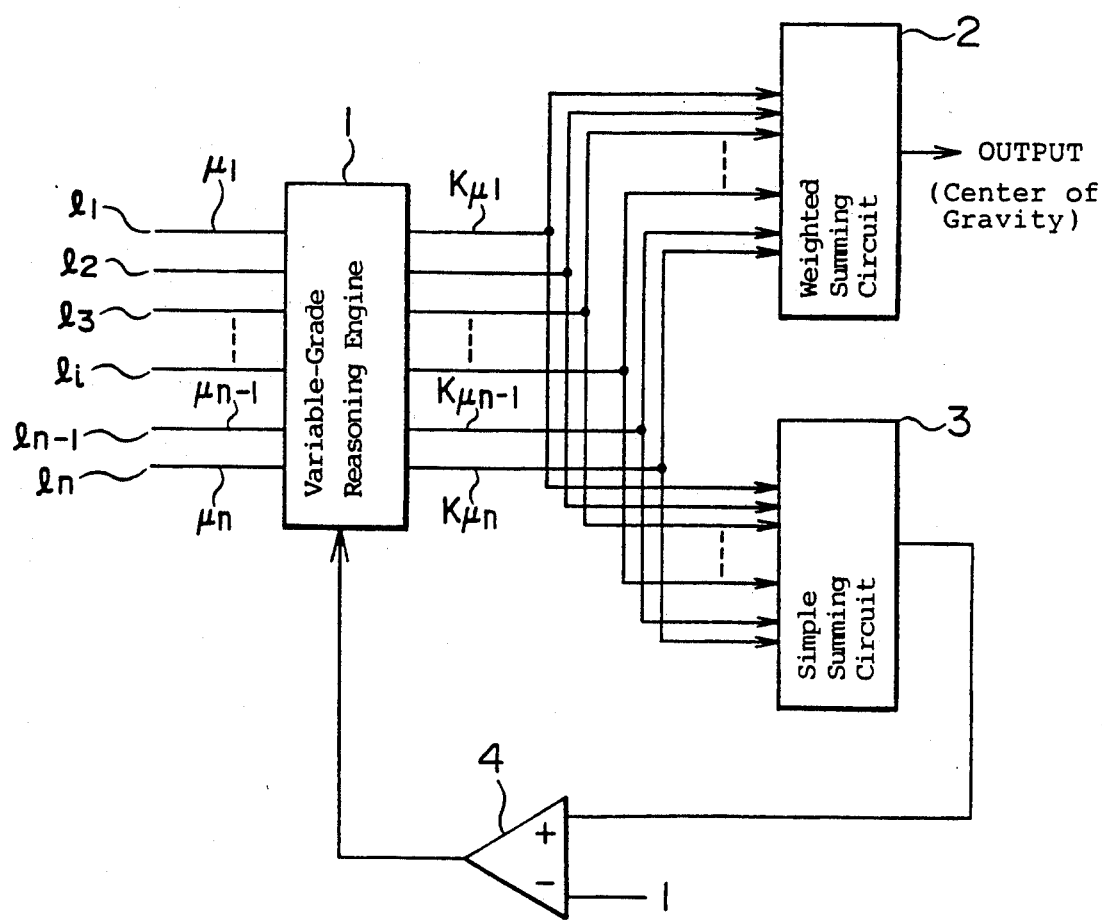
FIG. 7 shows a conventional center-of-gravity determining circuit.

FIG. 4 is a block diagram of another embodiment of the present invention, and FIG. 5 is a detail block diagram.

In this embodiment, the simple summing integration circuit 5 and the weighted summing circuit 2 shown in FIG. 1 are replaced with a weighted summing integration circuit 13 and a simple summing circuit 14, respectively. Accordingly, fuzzy information that is output onto the fuzzy buses 7 is input to both the weighted summing integration circuit 13 and the simple summing circuit 14, and an output $V_1$ from the weighted summing integration circuit 13 and an output $V_2$ from the simple summing circuit 14 are input to the comparator 6. Since the operation of he circuit can be analogized from the first embodiment, description thereof is omitted. In this embodiment, the determined value is output in the form of a reciprocal as follows:

$$V_1 = \frac{1}{C} \sum_{i=1}^{n} \frac{1}{R_i} \mu_i t \quad (7)$$

$$V_2 = -\frac{R_f}{R} \sum_{i=1}^{n} \mu_i \quad (8)$$

Assuming that when $V_1 = V_2$, $t = T$, $$1/T = \frac{R}{R_f C} \frac{\Sigma \frac{1}{R_i} \mu_i}{\Sigma \mu_i} \quad (9)$$

According to this embodiment, it is possible to obtain an output in the form of a pulse width which is equal to the reciprocal of the time T.

Thus, according to the present invention, the result of weighted summation of the elements of fuzzy information and the result of simple summation of them are compared in a comparator. Accordingly, the comparator output itself can be delivered as a pulse width without requiring a converter, thus enabling direct control of the actuator.

What is claimed is:

1. A center-of-gravity determining circuit for pulse generation comprising:
    weighted summing circuit means for receiving electric signals from a plurality of lines representative of fuzzy information distributed over a plurality of lines, multiplying said signals by respective values corresponding to grades of said lines, summing the multiplied signals and providing and output based thereon;
    simple summing integration circuit means for receiving said electric signals, executing summing integration of said electric signals without weighting and providing an output based thereon; and
    comparator means for comparing said outputs from said weighted summing circuit means and said simple summing integration circuit means.

2. A center-of-gravity determining circuit for pulse generation according to claim 1, wherein said comparator means includes means for providing an output in the form of a pulse width.

3. A center-of-gravity determining circuit for pulse generation according to claim 1, further including a trigger means for resetting said simple summing integration circuit means.

4. A center-of-gravity determining circuit for pulse generation comprising:
    weighted summing integration circuit means for receiving electric signals from a plurality of lines representative of fuzzy information distributed over a plurality of lines, multiplying said signals by respective values corresponding to grades of said lines, summing the multiplied signals and providing an output based thereon;

simple summing circuit means for receiving said electric signals, summing said signals without weighting and providing an output based thereon; and comparator means for comparing said outputs from said weighted summing integration circuit means and said simple summing circuit means.

5. A center-of-gravity determining circuit for pulse generation according to claim 4, wherein said comparator means includes means for providing an output in the form of a pulse width.

6. A center-of-gravity determining circuit for pulse generation according to claim 4, further including a trigger means for resetting said weighted integration summing circuit means.

* * * * *